United States Patent Office 3,510,414
Patented May 5, 1970

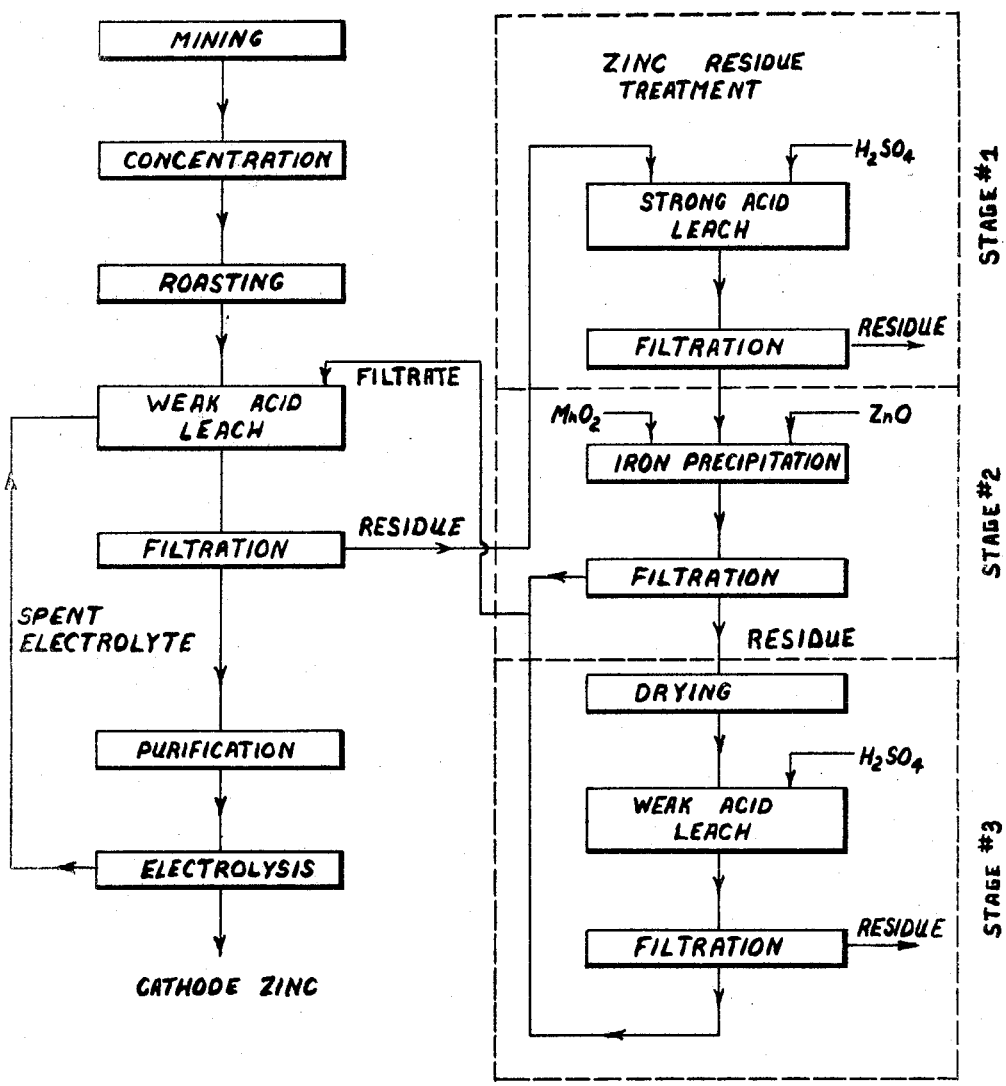

3,510,414
PROCESS OF RECOVERING METALS FROM
ZINC PLANT RESIDUE
Bruno Orlandini and Walter Schmittroth, Kellogg, Idaho, assignors to The Bunker Hill Company, a corporation of Delaware
Filed Dec. 4, 1967, Ser. No. 687,524
Int. Cl. C22d 1/22; C22b 19/02; C01g 9/06
U.S. Cl. 204—119                                10 Claims

ABSTRACT OF THE DISCLOSURE

A three stage process is described for recovering metals particularly zinc, from zinc plant residues. The zinc plant residue, in first stage, is first leached in strong sulphuric acid solution for 6-8 hours at a temperature between 90° C. and 94° C. to dissolve the zinc ferrites and other zinc compounds, and then settled or filtered to produce a first stage residue and solution. The first stage residue may be returned to a smelter for recovery of contained metal values. In the second stage, the clarified solution from the first stage is neutralized by a suitable neutralizing agent such as zinc oxide to reduce the acid concentration to a pH level of 5.0–5.3 to precipitate iron compounds and other impurities. After settling or filtering, a second stage residue and clarified solution are produced. The clarified solution is returned to the normal zinc plant leach tank for recovery of zinc values. The second stage residue is then dried by heating the residue to a temperature between 110° C. and 140° C. In the third stage, the dried residue is leached in a weak sulphuric acid solution to dissolve the contained zinc. The resulting leach pulp is filtered to produce a final low zinc containing residue, and a third stage filtrate which is returned to the normal zinc plant leach circuit.

BACKGROUND OF THE INVENTION

This invention relates to hydrometallurgical extraction of metals and more particularly it relates to the recovery of the zinc and other metals from zinc plant residues.

In the conventional process for recovering zinc from the zinc sulfide ores, the concentrated ore is roasted in an oxidizing atmosphere to transform a considerable portion of the zinc into a more acid soluble compound of zinc oxide. During the roasting process some of the zinc combines with the iron to form an insoluble zinc ferrite, generally believed to have a formula $ZnFe_2O_4$. The roasted ore is frequently referred to as zinc calcine. The calcine is then leached in a weak sulfuric acid solution to dissolve the zinc oxide to form zinc sulfate solution. The insolubles are separated from the solution by a filtration system. The calcine leach residue contains a high percentage of the zinc ferrite and lesser amounts of other insoluble materials such as zinc sulfide, lead, gold and silver. The calcine leach residue is generally referred to as zinc plant residue.

The zinc sulphate filtrate is then purified to remove many of the soluble impurities before the filtrate is utilized as the electrolyte in the electrolytic process for producing cathode zinc. The sulfuric acid solution generated during the electrolytic deposition of zinc, referred to as spent electrolyte, is frequently utilized as the agent for leaching the calcine.

Commonly, the zinc plants residue contains between 15–30% of the zinc. This represents a substantial loss. Considerable research has been conducted in the past 30 years in an effort to develop commercially feasible processes for recovering zinc from such residues.

The principal purpose of this invention is to provide a commercially feasible process for recovering zinc and other metals from zinc plant residues.

An additional object of this invention is to provide a process for recovering zinc from zinc plant residues that is efficient, simple and requires less capital outlay than those processes that are presently used.

These and other objects and advantages of this invention will become apparent upon a reading of the following detailed description of a preferred embodiment.

BRIEF DESCRIPTION OF THE DRAWINGS

A preferred embodiment of this invention is illustrated in the accompanying drawing showing a schematic flow diagram of the principal steps of this process invention.

DETAILED DESCRIPTION OF THE PREFERRED EMBODIMENT

The zinc is frequently mined from the earth in the form of a zinc sulfide ore. The zinc sulfide ore contains an appreciable amount of iron compounds and lesser amounts of other metallic materials such as copper, silver, gold, lead, antimony, cobalt and cadmium. After the mining operation the ore is concentrated by flotation to increase the concentration of zinc sulfide. The concentrated ore is then roasted to convert the zinc sulfide into a more soluble compound of zinc oxide. During the roasting process an appreciable amount of zinc combines with the iron to form a zinc ferrite. Roasted ore concentrates are generally referred to as calcine.

The calcine is then leached in a weak sulfuric acid solution to dissolve the zinc oxide to form a zinc sulfate solution. Some of the other metallic compounds also dissolve. Many of the other compounds are insoluble in the weak sulfuric acid solution and fail to dissolve. Included in the insoluble compounds are zinc ferrite and a lesser amount of zinc sulfide that was not completely oxidized during the roasting process. Gold, silver and lead are included in the insolubles. The residue frequently contains about 30% of the cadmium and about 50% of the copper contained in the ore. After the leaching process, the solution flows through a filtration system to separate the solution from the residue.

The principal portion of this invention concerns the recovery of the metals, particularly zinc, cadmium, copper from the residue that is filtered from the calcine leach pulp. This residue as previously mentioned, is referred to in the industry as zinc plant residue. The zinc plant residue is processed in a three stage process in which the residue is first leached in a strong sulfuric acid solution having a sulfuric acid concentration in excess of the stoichiometrical equivalent to the zinc in the residue. It has been found that 20 to 50 grams per liter of excess sulfuric acid in the leach solution is advantageous. The strong sulfuric acid leach solution is maintained at a temperature between 90–94 degrees C. to increase the dissolution of the zinc compounds. The copper, cadmium and iron are also dissolved to form soluble sulfates. The lead, silver and gold do not dissolve. It is found that it is advisable to leach the residue for six to eight hours. The leach pulp is then processed through a filtration or settling system or both in which the insoluble materials (lead, silver and gold) are removed from the sulfate filtrate. The residue from this step is generally further processed in a smelter to recover the lead, silver and gold. From the filtration step the sulfate filtrate is processed through the second stage in which the filtrate is neutralized to a pH of between 5.0 and 5.3 by the addition of zinc oxide or other suitable neutralizing agent such as cadmium oxide to precipitate the iron sulfate [$Fe_2(SO_4)_3$] and ferric hydroxide [$Fe(OH)_3$]. Manganese dioxide is also added to the filtrate to oxidize the ferrous iron to the ferric state to insure complete precipitation of the iron.

The neutralized solution is maintained at a temperature of about 90° C. for several hours. The neutralizing step is completed when the total soluble iron concentration in the solution is less than 0.5 gram per liter. The solution is neutral to methyl orange. The neutralized solution is then passed through a filtration or settling system or both, to separate the residue from the solution. The filtrate, containing soluble zinc, cadmium, and copper sulfate, is added to the calcine leach tank as is shown in the accompanying drawing.

The predominantly iron residue generally contains appreciable amounts of entrained soluble zinc compounds. The entrained zinc as recovered by the following important third stage steps.

The residue is first dried at temperatures between 110° and 140° C. to recrystallize the zinc to soluble zinc compounds. After the residue has adequately dried, the residue is ground into small particles and then leached in a weak sulfuric acid solution of between 0–8 grams of sulfuric acid per liter of solution to dissolve the soluble zinc compounds, and form a zinc sulfate solution. The solution is then passed through a filtration system to separate the zinc sulfate from the residue. The filtrate is added to the calcine leach tank. The resultant zinc sulfate filtrate is purified to remove and recover the copper and cadmium. The purified zinc sulfate filtrate is utilized as the electrolyte in the electrolytic process for recovering the zinc as cathode zinc.

By utilizing the above process over 80% of the zinc in the zinc plant residue may be recovered.

Example

A 757 gram sample of the zinc plant residue contained 19.9% zinc, 19.4% iron, 7.9% lead and 19.8% of other material including copper, cadmium, gold and silver. The residue was leached in a 5 liter sulfuric acid solution containing 120 grams of sulfuric acid per liter of solution. The residue was leached for 6 to 8 hours at approximately 90° C. At the end of the period this solution had a concentration of 25 grams sulfuric acid. It was found that 84.4% of the copper was dissolved into solution and approximately 84% of the iron dissolved. The leach pulp was filtered to separate the undissolved portions from the solution. An assay of the remaining residue showed the following composition: 4.4% zinc, 8% iron, 14.5% lead and small amounts of copper and gold.

The filtrate was then neutralized by the addition of sufficient amounts of zinc oxide to bring the solution to a pH value of 5.0 to 5.3 (neutral to methyl orange) to precipitate the iron compounds. This solution is maintained at a temperature of approximately 90% C. for several hours. Provisions are made for the addition of manganese dioxide or another suitable oxidizing agent to oxidize the ferrous iron to the ferric state. The step is complete when the soluble iron concentration is less than 0.5 gram per liter. The solution is then filtered to separate the predominantly iron sulfate precipitate from the sulfate solution. An assay of the residue showed that it contained 26.8% zinc. To recover a substantial portion of the remaining zinc values from the residue the residue was processed through the third stage of the zinc plant residue treatment. The residue was heated to a temperature of between 100° and 140° C. to recrystallize the contained zinc compounds for facilitating additional leaching. After drying the residue, it was ground into fine particles and then leached in a weak acid solution of between 2 to 3 grams of sulfuric acid per liter of solution at a temperature of approximately 90° C. for one hour. The leach pulp solution was then filtered to remove the residue from the sulfate filtrate. It was found that 90.2% of the zinc was recovered from the first stage residue.

It should be understood that the above described embodiment could be altered and modified without deviating from the principle of this process invention.

What we claim as new and desire to protect by Letters Patent of the United States is:

1. A process for the extraction of zinc from zinc plant residue containing zinc ferrite comprising the steps of:
    (a) leaching the residue with a strong sulfuric acid solution to dissolve at least a portion of the zinc ferrite;
    (b) neutralizing the solution with a neutralizing agent to precipitate at least a portion of the iron;
    (c) filtering the solution to separate the iron precipitate residue from the solution;
    (d) drying the iron precipitate residue at a temperature of between 110 degrees and 140 degrees C.;
    (e) leaching the dried iron precipitate residue with a weak sulfuric acid solution to dissolve any remaining soluble zinc values from the residue;
    (f) filtering the solution to separate the insoluble iron residue from the zinc sulfate solution.

2. A process as defined in claim 1 wherein the zinc plant residue is leached in a strong sulfuric acid solution at a temperature of 90–94 degrees C.

3. A process as defined in claim 2 wherein the strong sulfuric acid solution has an initial sulfuric acid concentration of 20 to 50 grams per liter in excess of the stoichiometrical equivalent to the zinc in the residue.

4. A process as defined in claim 1 wherein the solution is neutralized to a pH level of 5.0 to 5.3.

5. A process as defined in claim 4 wherein the neutralizing agent is zinc oxide.

6. A process as defined in claim 1 wherein the dry iron precipitate residue is leached at a temperature of approximately 90° C. by a weak sulfuric acid solution having an initial sulfuric acid concentration of between 0 and 8 grams per liter of solution.

7. In a process for recovering metallic zinc from zinc sulfide ore containing iron compounds by separating the ore to form a zinc concentrate, roasting the concentrate to form a zinc calcine containing zinc oxide and zinc ferrite, leaching the calcine to dissolve the zinc oxide to form a calcine leach pulp, filtering the calcine leach pulp to separate the zinc ferrite residue from the leach solution, purifying the calcine leach filtrate to form a zinc sulfate electrolyte and depositing the zinc on a cathode by electrolytic deposition, in which the process includes the improvement of a leaching sub-process for recovering the zinc from the zinc ferrite residue by performing the steps of:
    (a) leaching the zinc ferrite residue with a strong sulfuric acid solution to dissolve at least a portion of the zinc ferrite;
    (b) neutralizing the solution with a neutralizing agent to precipitate the iron to form a leach pulp;
    (c) filtering the leach pulp to separate the precipitate from the solution to form a filtrate and a residue;
    (d) drying the residue by heating the residue to a temperature of between 110° and 140° C.;
    (e) leaching the dried residue in a weak sulfuric acid solution to dissolve any soluble zinc values that may be contained in the dried residue to form a second leach pulp; and
    (f) filtering the second leach pulp to separate the insoluble iron residue from the zinc sulfate solution to form a resultant filtrate.

8. In a process as defined in claim 7 wherein the dried second residue is leached in a weak acid solution having concentration of between 0 and 8 grams of sulfuric acid per liter of solution at a temperature of approximately 90° C.

9. In a process as defined in claim 8 wherein the strong sulfuric acid leach solution is neutralized by a sufficient amount of zinc oxide to reduce the acid concentration to a pH level of between 5.0 and 5.3.

10. In a process as defined in claim 7 further including the sub-process step of adding the filtrates to the calcine leach prior to the purification process.

References Cited

UNITED STATES PATENTS

| | | | |
|---|---|---|---|
| 3,143,486 | 8/1964 | Pickering et al. | 204—119 |
| 2,772,230 | 11/1956 | Hollander et al. | 204—119 |
| 1,761,782 | 6/1930 | Fischer | 23—125 |
| 1,255,438 | 2/1918 | Laist | 23—125 |

JOHN H. MACK, Primary Examiner

R. L. ANDREWS, Assistant Examiner

U.S. Cl. X.R.

23—125; 75—120